United States Patent Office 2,713,572
Patented July 19, 1955

2,713,572

VULCANIZATION OF RUBBER

George E. Hall, Jr., Wyandotte, Mich., assignor to Wyandotte Chemicals Corporation, Wyandotte, Mich., a corporation of Michigan No Drawing. Application August 12, 1953, Serial No. 373,917

10 Claims. (Cl. 260—79.5)

This invention relates to a method of vulcanizing conjugated diolefin type elastomers and to the vulcanizates obtained thereby. In particular, the invention relates to a method of vulcanizing conjugated diolefin type elastomers in which a thiazyl sulfide is employed as the primary accelerator and in which certain novel conjugated polyoxypropylene-polyoxyethylene compounds are included in the elastomer as an activator for the thiazyl sulfide.

In modern rubber technology, thiazyl sulfides, e. g. mercaptobenzothiazole and 2,2′ benzothiazyl sulfide, are used extensively as vulcanization accelerators, and frequently one or more "secondary accelerators" or "activators" are employed in conjunction therewith. Typical examples of such activators are tetramethylthiuram disulfide, tetramethylthiuram sulfide, zinc diethylthiocarbonate, etc. The presently used activators are high in cost and frequently cause overcuring of the vulcanizate, which overcuring results in poor aging properties in the vulcanizate.

It is an object of this invention to provide a method for vulcanizing conjugated diolefin type elastomers which includes the use of an improved class of activators in conjunction with a primary thiazyl sulfide accelerator.

Another object of this invention is to provide vulcanized conjugated diolefin type elastomers having improved aging properties.

Other objects and advantages of this invention will be apparent from the following detailed description thereof.

It has been discovered that certain novel conjugated polyoxypropylene-polyoxyethylene compounds may be advantageously employed as activators for thiazyl sulfides in accelerating the vulcanization of conjugated diolefin type elastomers. The conjoint use of a thiazyl sulfide and a novel conjugated polyoxypropylene-polyoxyethylene compounds not only provides rapid vulcanization of the elastomer, but also prevents overcuring of the elastomer and thus provides a vulcanizate having improved aging properties. In addition to their performance characteristics, the conjugated polyoxypropylene-polyoxyethylene compounds are substantially lower in cost than many of the commonly used activators.

The conjugated polyoxypropylene - polyoxyethylene compounds are prepared by condensing ethylene oxide with a polyoxypropylene polymer. Sufficient ethylene oxide is condensed with the polyoxypropylene polymer so that the oxyethylene content constitutes at least 20%, by weight, of the resultant product. Superior results are obtained when the oxyethylene content constitutes substantially more than 20% of the compound and excellent results are obtained when the oxyethylene content constitutes 90% or even more of the compound.

The polyoxypropylene polymers, with which ethylene oxide is condensed to prepare the conjugated polyoxypropylene-polyoxyethylene compounds, are prepared by condensing propylene oxide with an organic compound containing one or a plurality of reactive hydrogen atoms. The particular structure of the conjugated polyoxypropylene-polyoxyethylene compounds required to obtain good activation of the thiazyl sulfide accelerators is dependent in part upon the particular reactive hydrogen compound with which propylene oxide is condensed to form the polyoxypropylene polymer.

When the reactive hydrogen compound contains one active hydrogen atom, the polyoxypropylene polymer must contain at least six oxypropylene groups to activate the thiazyl sulfide accelerator. Accordingly, the structure of the polyoxypropylene-polyoxyethylene compounds that are obtained from a reactive hydrogen compound containing one reactive hydrogen atom may be represented by the following formula:

[A]  $\quad Y(C_3H_6O)_n(C_2H_4O)_mH$ where:

Y is the residue of an organic compound containing one reactive hydrogen atom,
n has a value of at least 6, and
m has a value such that the oxyethylene groups constitute at least 20%, by weight, of the compound.

While at least six oxypropylene groups are required in the above type compounds, superior results are obtained when the conjugated polyoxypropylene-polyoxyethylene compounds contain 10–20, or even more, oxypropylene groups. A complete description of such compounds and their preparation is contained in the copending application of Donald R. Jackson and Lester G. Lundsted's Serial No. 229,128, filed May 31, 1951, now U. S. 2,677,700, and that description is incorporated herein by reference.

When the polyoxypropylene polymer is prepared by condensing propylene oxide with a reactive hydrogen compound containing a plurality of reactive hydrogen atoms, the conjugated polyoxypropylene-polyoxyethylene compounds must contain at least 12 oxypropylene groups to obtain good activation of the thiazyl sulfide accelerator, and superior results are obtained when the compounds contain 20, or even more, oxypropylene groups. The structure of the conjugated polyoxypropylene-polyoxyethylene compounds which are obtained from reactive hydrogen compounds containing a plurality of reactive hydrogen atoms is represented by the formula below:

[B]  Polyoxypropylene polymer $[(C_2H_4O)_mH]_x$ where:

The polyoxypropylene polymer is the condensation product of propylene oxide and an organic compound containing a plurality of reactive hydrogen atoms and contains at least 12 oxypropylene groups,
m is an integer,
x is an integer not larger than the number of reactive hydrogen atoms contained in the organic compound from which the polyoxypropylene polymer is derived, and
m and x have values such that the oxyethylene groups constitute at least 20%, by weight, of the compound.

A complete description of the compounds conforming to the above formula and their preparation is contained in copending application of Lester G. Lundsted, Serial No. 386,945, filed October 19, 1953, now U. S. 2,674,619, which description is incorporated herein by reference.

As set forth in the above mentioned application of Lester G. Lundsted, any reactive hydrogen compound containing a plurality of reactive hydrogen atoms can be used in preparing polyoxypropylene polymers of the compounds described in Formula B. In the practice of the present invention, however, especially good results are obtained when the polyoxypropylene polymer is obtained by condensing propylene oxide with an arylsulfonamide or an aliphatic diamine, e. g. ethylene diamine.

In the above description of the conjugated polyoxypropylene-polyoxyethylene compounds reference was made to individual compounds containing prescribed minimum numbers of oxypropylene groups and prescribed minimum oxyethylene contents. The nature of alkylene oxide condensations is such, however, that mixtures of compounds are inevitably obtained, and the mixtures of the conjugated polyoxypropylene-polyoxyethylene compounds cannot be separated into individual compounds by known methods. Consequently, it should be recognized that the critical limits previously described are actually average values of mixtures of such compounds.

Typical of the thiazyl sulfide accelerators with which the conjugated polyoxypropylene-polyoxyethylene compounds may be employed in vulcanizing conjugated diolefin type elastomers are the following:

Mercaptobenzothiazole
Zinc mercaptobenzothiazole
2,2' benzothiazyl disulfide
N-cyclohexylbenzothiazyl sulfenamide
2-mercapto-4-ethylthiazole
Bis(4,5-dimethylthiazyl)sulfide
Dinitrophenylbenzothiazyl sulfide
Phenylaminomethyl-2-benzothiazyl sulfide It is recognized in the art that the thiazyl sulfide accelerators are effective in accelerating the vulcanization of any conjugated diolefin type elastomer. Thus, the thiazyl sulfides are used in conjunction with not only natural rubber, but with all of the diolefin synthetic rubbers such as GR-S (copolymer of butadiene 1,3 and styrene), butyl rubber (copolymer of isobutylene and butadiene 1,3), the acrylonitrile rubbers (copolymer of butadiene 1,3 and acrylonitrile), etc. The conjugated polyoxypropylene-polyoxyethylene compounds may be used in conjunction with a thiazyl sulfide in vulcanizing any of the above mentioned diolefin elastomers.

The conjugated polyoxypropylene-polyoxyethylene activators may be used alone with the thiazyl sulfides or may be used in combination with other activators for thiazyl sulfides. In many types of rubber stocks, e. g. tire-tread stocks, mechanical goods stocks, etc. it is preferred to use the conjugated polyoxypropylene-polyoxyethylene compounds as the sole activator. In other types of rubber stocks, particular where rapid cures are desired at low temperatures, e. g. in golf ball cover stocks, latex dipped goods, etc., the conjugated polyoxypropylene-polyoxyethylene compounds may be used in conjunction with other activators.

The following examples are set forth to more clearly illustrate the principle and practice of this invention to those skilled in the art.

EXAMPLE 1

The activating effect of a conjugated polyoxypropylene-polyoxyethylene compound was shown by the increment addition of the compound to a GR-S formulation that was accelerated with 2,2' benzothiazyl disulfide. The conjugated polyoxypropylene-polyoxyethylene compound was prepared by condensing four parts of ethylene oxide with six parts of polyoxypropylene polymer of 1200 molecular weight to prepare a product containing 40% oxyethylene content. The polyoxypropylene polymer was prepared by condensing propylene oxide with propylene glycol, and the polyoxypropylene polymer contained approximately 20 oxypropylene groups. The rubber formulation is shown below:

| Compounding ingredient: | Parts by weight |
| --- | --- |
| GR-S | 100 |
| Zinc oxide | 3 |
| Stearic acid | 2 |
| Cumar resin | 10 |
| Carbon black | 20 |
| Calcium carbonate | 40 |
| Petroleum softener | 8 |
| Wood rosin | 2 |
| Sulfur | 2.5 |
| 2,2' benzothiazyl disulfide | 1.5 |
| Tetramethylthiuram disulfide | 0.2 |
| Conjugated polyoxypropylene-polyoxyethylene compound | Variable |

After press curing the stocks for 30 minutes at 287° F., the following physical properties were obtained.

Table I

| Parts Activator | Modulus, p. s. i. | | Elongation, Percent |
| --- | --- | --- | --- |
| | 300% | 500% | |
| 0 | 275 | 750 | 760 |
| 0.05 | 300 | 1,150 | 650 |
| 0.10 | 375 | 1,125 | 670 |
| 0.15 | 450 | 1,500 | 580 |
| 0.20 | 450 | 1,400 | 605 |

In examining Table I, it will be noted that progressively higher modulus values were obtained as the content of the polyoxypropylene-polyoxyethylene compound was increased. It will also be noted that the ultimate elongation of the stocks decreased as the activator content was increased. As is apparent to those skilled in the rubber compounding part, the increase in modulus value with the concomitant decrease in ultimate elongation is evidence of a higher degree of vulcanization or cure, and definitely establishes that the conjugated polyoxypropylene-polyoxyethylene compound activates the cure of the stock.

EXAMPLE 2

The effect of activator concentration on vulcanization, when the conjugated polyoxypropylene-polyoxyethylene compound was used as the sole activator, was determined by adding varying quantities of the compound described in Example 1 to a GR-S formulation. The GR-S formulation used was identical with the one shown in Example 1 except that the tetramethylthiuram disulfide was omitted. After press curing for 30 minutes at 287° F., the following physical properties were obtained:

Table II

| Parts Activator | Modulus, p. s. i. | | Tensile, p. s. i. | Elongation, Percent |
| --- | --- | --- | --- | --- |
| | 300% | 500% | | |
| 0 | No cure | No cure | No cure | No cure. |
| 0.2 | 50 | 250 | 1,870 | 1,030. |
| 0.4 | 100 | 550 | 2,140 | 830. |
| 0.6 | 200 | 700 | 2,430 | 790. |
| 0.8 | 225 | 800 | 2,250 | 730. |
| 1.0 | 250 | 850 | 2,130 | 715. |

The above results indicate that the optimum concentration of the particular conjugated polyoxypropylene-polyoxyethylene compound tested was about 0.6 part activator per 100 parts of rubber. With other of the conjugated polyoxypropylene-polyoxyethylene compounds the optimum concentration will vary from about 0.2 part to about 0.8 part per hundred parts elastomer and acceptable results are obtained within the broader limits of from about 0.1 part to about 1.2 parts per hundred parts elastomer.

EXAMPLE 3

Four series of conjugated polyoxypropylene-polyoxyethylene compounds were evaluated in the following formulation:

| Compounding ingredient: | Parts by weight |
|---|---|
| GR-S | 100 |
| Zinc oxide | 5 |
| Stearic acid | 2 |
| Cumar resin | 10 |
| Carbon black | 20 |
| Calcium carbonate | 40 |
| Petroleum softener | 8 |
| Wood rosin | 2 |
| Sulfur | 2.5 |
| 2,2' benzothiazyl disulfide | 1.5 |
| Conjugated polyoxypropylene-polyoxyethylene compound | 0.2 |

The compounds in each series differed from each other only in oxyethylene content, and the tests were designed to show the importance of this variable. The four series of compounds represented products in which the polyoxypropylene polymer was derived from four different reactive hydrogen compounds. The specific composition of the conjugated polyoxypropylene-polyoxyethylene compound and the physical properties that were obtained after curing 90 minutes at 287° F. are shown in Table III below:

*Table III*

| Test No. | Composition Polyoxypropylene-Polyoxyethylene Compound | | | Modulus, p. s. i. | | Tensile, p. s. i. | Elongation, Percent |
|---|---|---|---|---|---|---|---|
| | Starting Reactive Hydrogen Compound | Number Oxypropylene Groups in Polyoxypropylene Polymer | Oxyethylene Content, Wt. Percent | 300% | 500% | | |
| 1ᵃ | Propylene Glycol | 30 | 30 | 200 | 675 | 2,260 | 825 |
| 2ᵃ | do | 30 | 40 | 175 | 650 | 2,060 | 810 |
| 3ᵃ | do | 30 | 80 | 325 | 750 | 1,830 | 750 |
| 4 | Benzenesulfonamide | 16 | 50 | 175 | 700 | 2,560 | 805 |
| 5 | do | 16 | 80 | 250 | 875 | 2,300 | 745 |
| 6 | N-Phenyl Benzenesulfonamide | 7 | 34 | 125 | 475 | 1,780 | 825 |
| 7 | do | 7 | 51 | 150 | 600 | 2,260 | 830 |
| 8 | do | 7 | 67 | 200 | 750 | 2,340 | 785 |
| 9 | Ethylene Diamine | 37 | 25 | 150 | 500 | 2,360 | 900 |
| 10 | do | 37 | 50 | 175 | 675 | 2,210 | 805 |
| 11 | do | 37 | 75 | 250 | 825 | 2,090 | 715 |
| 12 | do | 37 | 85 | 300 | 950 | 2,600 | 750 |

ᵃ Zinc oxide in formula decreased to 3.0 parts; vulcanizates cured 30 minutes.

It will be noted in each of the above series that the modulus values increased as the oxyethylene content of the activator was increased. It will be further noted that with the increase in modulus value there was concomitant decrease in the ultimate elongation of the vulcanizate. These results indicate that an increased activation of the thiazyl sulfide accelerator and a tighter cure were obtained as the oxyethylene content of the conjugated polyoxypropylene-polyoxyethylene was increased.

EXAMPLE 4

As noted earlier herein, an outstanding advantage of the conjugated polyoxypropylene-polyoxyethylene activators is that they reduce the tendency of rubber stocks to overcure, which overcuring results in poor aging properties. The principal effect of poor aging properties is a loss in tensile strength. To establish the advantage of the conjugated polyoxypropylene-polyoxyethylene compounds in this regard, two vulcanizates were prepared and their tensile strengths were determined when prepared and after aging for 24 hours at 212° F. The rubber formulation used was the one shown in Examples II. The structure of the activators and the test results are shown in Table IV below:

*Table IV*

| Test No. | Composition Polyoxypropylene-Polyoxyethylene Compound | | | Tensile, p. s. i. when prepared | Tensile, p. s. i. after 24 hours aging 212° F. | Retained Tensile, Percent |
|---|---|---|---|---|---|---|
| | Starting Reactive Hydrogen Compound | Number Oxypropylene Groups in Polyoxypropylene Polymer | Oxyethylene Content, Wt. Percent | | | |
| 1 | Ethylene Diamine | 37 | 85 | 2,470 | 2,360 | 96 |
| 2 | Benzenesulfonamide | 16 | 80 | 2,280 | 2,240 | 98 |

It is seen in the above table, that the vulcanizates retained over 96% of their tensile strength and had tensile values of over 2200 p. s. i. after this drastic aging treatment. As a comparison, when an identical rubber stock, except that tetramethylthiuram disulfide was used as the activator, was aged in this manner, the stock retained only 78% of its original tensile strength and had a tensile strength of only 1820 p. s. i.

It will be obvious to those skilled in the art that the invention may be practiced with the use of fillers, softeners, antioxidants and compounding ingredients other than those shown in the above examples.

What is claimed is:

1. A conjugated diolefin elastomer containing sulfur, a primary thiazyl sulfide accelerator and, as an activator for the thiazyl sulfide, a mixture of conjugated polyoxypropylene-polyoxyethylene compounds in which the oxyethylene content constitutes at least 20%, by weight, of the compounds and in which the polyoxypropylene portion of the compounds contains an average of at least 12 oxypropylene groups and is obtained by condensing propylene oxide with ethylene diamine; said activator being present in an amount sufficient to activate the primary accelerator.

2. A conjugated diolefin elastomer containing sulfur, a primary thiazyl sulfide accelerator and, as an activator for the thiazyl sulfide, a mixture of conjugated polyoxypropylene-polyoxyethylene compounds in which the oxyethylene content constitutes at least 20%, by weight, of the compounds and in which the polyoxypropylene portion of the compounds contains an average of at least 12 oxypropylene groups and is obtained by condensing propylene oxide with benzenesulfonamide; said activator being present in an amount sufficient to activate the primary accelerator.

3. The composition of claim 9 in which the conjugated diolefin elastomer is a rubbery copolymer of butadiene and styrene.

4. The composition of claim 1 in which the conjugated diolefin elastomer is a rubbery copolymer of butadiene and styrene.

5. The composition of claim 2 in which the conjugated diolefin elastomer is a rubbery copolymer of butadiene and styrene.

6. The composition of claim 9 in which the conjugated diolefin elastomer is natural rubber.

7. In the method of vulcanizing a conjugated diolefin elastomer containing sulfur and a primary thiazyl sulfide which comprises heating the uncured conjugated diolefin to a vulcanizing temperature; the improvement which comprises incorporating in the conjugated diolefin elastomer from about 0.1 to about 1.2 parts (based upon 100 parts by weight of the elastomer) of a mixture of conjugated polyoxypropylene-polyoxyethylene compounds in which the oxyethylene content constitutes at least 20%, by weight, of the compounds and in which the polyoxypropylene portion of the compounds contains an average of at least 12 oxypropylene groups and is obtained by condensing propylene oxide with ethylene diamine.

8. In the method of vulcanizing a conjugated diolefin elastomer containing sulfur and a primary thiazyl sulfide which comprises heating the uncured conjugated diolefin to a vulcanizing temperature; the improvement which comprises incorporating in the conjugated diolefin elastomer from 0.1 to about 1.2 parts (based upon 100 parts by weight of the elastomer) of a mixture of conjugated polyoxypropylene-polyoxyethylene compounds in which the oxyethylene content constitutes at least 20%, by weight, of the compounds and in which the polyoxypropylene portion of the compounds contains an average of at least 12 oxypropylene groups and is obtained by condensing propylene oxide with benzenesulfonamide.

9. A conjugated diolefin elastomer containing sulphur, a primary thiazyl sulfide accelerator and, as an activator for the thiazyl sulfide, a substance selected from the group of (a) a mixture of conjugated polyoxypropylene-polyoxyethylene compounds in which the oxyethylene content constitutes at least 20%, by weight, of the compounds and in which the polyoxypropylene portion of the compounds contains an average of at least 6 oxypropylene groups and is prepared by condensing propylene oxide with an organic compound containing one reactive hydrogen atom, and (b) a mixture of conjugated polyoxypropylene-polyoxyethylene compounds in which the oxyethylene content constitutes at least 20%, by weight, of the compounds and in which the polyoxypropylene portion of the compounds contains an average of at least 12 oxypropylene groups and is prepared by condensing propylene oxide with an organic compound containing a plurality of reactive hydrogen atoms; said activator being present in an amount sufficient to activate the primary accelerator.

10. In the method of vulcanizing a conjugated diolefin elastomer containing sulphur and a primary thiazyl sulfide which comprises heating the uncured conjugated diolefin to a vulcanizing temperature; the improvement which comprises incorporating in the conjugated diolefin elastomer from about 0.1 to 1.2 parts (based upon 100 parts by weight of the elastomer) of a substance selected from the group consisting of (a) a mixture of conjugated polyoxypropylene-polyoxyethylene compounds in which the oxyethylene content constitutes at least 20%, by weight, of the compounds and in which the polyoxypropylene portion of the compounds contains an average of at leach 6 oxypropylene groups and is prepared by condensing propylene oxide with an organic compound containing one reactive hydrogen atom, and (b) a mixture of conjugated polyoxypropylene-polyoxyethylene compounds in which the oxyethylene content constitutes at least 20%, by weight, of the compounds and in which the polyoxypropylene portion of the compounds contains an average of at least 12 oxypropylene groups and is prepared by condensing propylene oxide with an organic compound containing a plurality of reactive hydrogen atoms.

No references cited.